(12) United States Patent
Welford (10) Patent No.: US 7,234,725 B2
(45) Date of Patent: Jun. 26, 2007

(54) DRIVER SIDE AIRBAG MODULE ASSEMBLY

(75) Inventor: Richard Welford, Layton, UT (US)

(73) Assignee: Autoliv ASP, Inc., Ogden, UT (US)

(*) Notice: Subject to any disclaimer, the term of this patent is extended or adjusted under 35 U.S.C. 154(b) by 121 days.

(21) Appl. No.: 10/856,169

(22) Filed: May 28, 2004

(65) Prior Publication Data

US 2005/0263988 A1   Dec. 1, 2005

(51) Int. Cl.
*B60R 21/215* (2006.01)

(52) U.S. Cl. .................................... 280/728.3; 280/731

(58) Field of Classification Search ............ 280/728.3, 280/731, 728.2
See application file for complete search history.

(56) References Cited

U.S. PATENT DOCUMENTS

| | | | |
|---|---|---|---|
| 3,822,894 A | | 7/1974 | Muller et al. |
| 4,893,833 A | | 1/1990 | DiSalvo et al. |
| 5,167,427 A | * | 12/1992 | Baba .................... 280/728.3 |
| 5,195,776 A | | 3/1993 | Sakakida et al. |
| 5,217,253 A | | 6/1993 | Pray |
| 5,277,443 A | | 1/1994 | Grant et al. |
| 5,613,701 A | | 3/1997 | Bentley et al. |
| 6,082,762 A | | 7/2000 | Preisler et al. |
| 6,695,344 B2 | * | 2/2004 | Hauer ....................... 280/731 |
| 6,786,504 B2 | * | 9/2004 | Lorenz et al. ........... 280/728.2 |
| 6,942,246 B2 | * | 9/2005 | Hohne et al. ............... 280/731 |
| 2004/0169355 A1 | * | 9/2004 | Helmstetter et al. ..... 280/728.2 |

* cited by examiner

*Primary Examiner*—David R. Dunn
(74) *Attorney, Agent, or Firm*—Sally J Brown; Pauley Petersen & Erickson (57) ABSTRACT

An airbag module assembly including a module housing, a door and a door retainer ring. The module housing forms a compartment adapted to contain an inflatable restraint airbag cushion in a stored state. The module housing has at least one open end, and includes at least one side wall and at least one face wall generally perpendicularly disposed relative to the at least one side wall about the at least one open end. The door retainer ring is adapted to be joined to the module housing about the module housing open end. The door includes a circumference portion and has an inner surface and an outer surface. The door, in a static state, is disposed over the module housing to enclose the module housing open end with at least the circumference portion of the door disposed between the door retainer ring and the module housing. The circumference portion of the door includes at least one release portion and at least one hinge section. In the assembly, upon inflation of the inflatable restraint airbag cushion, the inflatable restraint airbag cushion expands against the inner surface of the door, whereby at least the release portion is disposed from between the door retaining ring and the module housing with the door rotatably hinging about the at least one hinge section.

27 Claims, 4 Drawing Sheets

DRIVER SIDE AIRBAG MODULE ASSEMBLY

BACKGROUND OF THE INVENTION

This invention relates generally to inflatable passive restraint systems for use in vehicles for restraining the movement of a seated occupant such as in the event of a collision. More particularly, the invention relates to an improved airbag module assembly especially suited for driver side occupant protection.

It is well known to protect a vehicle occupant using a cushion or bag, e.g., an "airbag cushion," that is inflated or expanded with gas such as when the vehicle encounters a sudden deceleration, such as in the event of a collision. In such systems, the airbag cushion is normally housed in an uninflated and folded condition to minimize space requirements. Upon actuation of the system, the cushion begins to be inflated in a matter of no more than a few milliseconds with gas produced or supplied by a device commonly referred to as an "inflator."

Vehicular inflatable restraint systems generally include multiple crash sensors generally positioned about or mounted to the frame and/or body of the subject vehicle and serve to sense sudden decelerations by the vehicle. In turn, upon activation, one or more of the sensors sends a signal to an airbag module assembly strategically positioned within the riding compartment of the vehicle to actuate deployment of the airbag. In practice, such an airbag cushion is desirably deployed into a location within the vehicle between the occupant and certain parts of the vehicle interior, such as a door, steering wheel, instrument panel or the like, to prevent or avoid the occupant from forcibly striking such part(s) of the vehicle interior.

An airbag module assembly provided for the protection of a vehicle driver, i.e., a driver side airbag module assembly, is typically mounted in a storage compartment located along the steering column of the vehicle. In airbag module assemblies, it is common for the airbag cushion and, at least a portion, of the associated inflator device to be stowed or contained within a module housing such as composed, at least in part, by a housing member such as in the form of a canister. Such a housing member component typically has joined or connected therewith an associated or corresponding cover member or element.

As will be appreciated, the inclusion of such a cover member can be desirable in various respects. For example, such a cover member may desirably serve to enclose various of the respective module assembly components such as to prevent damage thereto, such as damage to the airbag cushion. Further, it has become common to provide for the inclusion of such a cover member as a decorative feature such as forms a part of the steering wheel or vehicle interior trim. Such cover members typically include a frangible section, such as having tear seams or lines of reduced thickness such as to more readily permit one or more sections of the cover member to move upon system actuation such as to permit the associated airbag cushion to expand past the cover upon inflation.

Unfortunately, the inclusion of such tear seams or lines of reduced thickness in a cover member can present undesirable cosmetic or appearance problems. For example, such tear seams or lines of reduced thickness can produce or result in undesired show through (e.g., where shapes or features on the backside of the cover member can be relatively easily discerned from a viewing of the front side of the cover member), sink marks (e.g., where the cover member has an undesired, lower or uneven outer surface), or glossing (e.g., where additives in the material for forming the cover material undesirably separate and accumulate at the surface of the cover material during manufacture, resulting in a "glossy" finish), can result from processing. For example, when a cover member is prepared by molding fabrication of a thermoplastic elastomer, an uneven shrinkage of the cover material upon processing can result in show through, sink marks and/or glossing. Such uneven shrinkage can, for example, occur as a result of the item being processed having relatively widely varying thicknesses and thus varying processing time and condition requirements.

In practice, the frangible section of such cover members must be sufficiently strong to resist accidental opening prior to proper actuation of the restraint system. Consequently, the frangible sections of such cover members generally require the proper application of a relatively large force onto the cover, such as by the inflating airbag cushion, before the frangible section releases and permits the airbag cushion to deploy therethrough.

The application of such large forces may, however, create a risk that the cover or at least a portion thereof may undesirably become dislodged or unattached from the associated housing member. In order to reduce, minimize or eliminate the risk of such dislodgement or detachment, a need and a demand has existed for a cover attachment arrangement wherein the cover is securely attached to or with the module housing. Unfortunately, the need for strength in the connection between an associated cover and housing has often resulted in more complicated than desired connection schemes. For example, in order to ensure proper cover attachment and retention, common cover and housing connection schemes have incorporated or relied on the inclusion of one or more of the following features:

1) various secondary components, such as rivets or other fasteners or the like;
2) various secondary operations, such as crimping or the like;
3) relatively intricate or complicated shapes or forms; and
4) tethering of the opening cover member to the housing.

Furthermore, the inclusion of such features may typically undesirably increases the costs associated with the connection scheme. Further, the inclusion of such features typically undesirably complicates or makes more expensive the rework of such installations. For example, the rework of such designs is typically laborious and may require scrapping of one or more components involved in the rework.

Thus, there is a need and a demand for an improved airbag module assembly such as may desirably minimize or, preferably, avoid the use of tear seams or lines of reduced thickness in a cover member and thus preferably minimize or avoid the cosmetic or appearance problems commonly associated therewith. Further, there is a need and a demand for an improved airbag module assembly such as may more readily and easily permit or provide positive cover attachment throughout the deployment process and do so in a relatively simple, effective and efficient manner. In particular, there is a need and a demand for an improved airbag module cover attachment arrangement which more readily and easily permits or provides positive cover attachment throughout the deployment process without incorporating or relying on the inclusion of one or more of the following features:

1) secondary components, such as rivets or other fasteners or the like;
2) secondary operations, such as crimping or the like;

3) relatively intricate or complicated shapes or forms; and
4) tethering of the opening cover member to the housing.

SUMMARY OF THE INVENTION

A general object of the invention is to provide an improved airbag module assembly and combinations therewith.

A more specific objective of the invention is to overcome one or more of the problems described above.

The general object of the invention can be attained, at least in part, through an airbag module assembly that includes a module housing, a door and a door retainer ring. The module housing forms a compartment adapted to contain an inflatable restraint airbag cushion in a stored state. The module housing has at least one open end and includes at least one side wall and at least one face wall generally perpendicularly disposed relative to the at least one side wall about the at least one open end. The door retainer ring is adapted to be joined to the module housing about the module housing open end. The door includes a circumference portion. The door has an inner surface and an outer surface. The door, in a static state, is disposed over the module housing to enclose the module housing open end with at least the circumference portion of the door disposed between the door retainer ring and the module housing. The circumference portion of the door includes at least one release portion and at least one hinge section.

In the assembly, upon inflation of the inflatable restraint airbag cushion, the inflatable restraint airbag cushion expands against the inner surface of the door whereby at least the release portion is disposed from between the door retaining ring and the module housing with the door rotatably hinging about the at least one hinge section.

In contrast to airbag module assemblies in accordance with the invention, the prior art generally fails to provide airbag module assemblies having a cover attachment arrangement that allows for efficient cover opening while maintaining cover attachment with the module assembly throughout the deployment process without additional, and generally more expensive, attachment features. In addition, the prior art generally fails to provide an airbag module that can be cosmetically coordinated with the interior trim design of the vehicle in a manner that is either or both as effective or efficient as desired.

The invention further comprehends a cylindrical airbag module assembly that includes a module housing, a door and door retainer ring. The module housing is generally circular in cross section and sized and shaped to fit within an automotive vehicle steering wheel hub. The module housing forms a compartment adapted to contain an inflatable restraint airbag cushion in a stored state. The module housing has at least one open end and includes at least one side wall and at least one face wall generally perpendicularly disposed relative to the at least one side wall about the at least one open end. The face wall forms a flange comprising a plurality of openings passing therethrough.

The door retainer ring comprises a circular bezel and is adapted to be joined to the module housing about the module housing open end. The door retainer ring includes a base portion and a plurality of attachment legs generally perpendicularly extending from the base portion. In the assembly, each of the attachment legs is in register with a corresponding one of the flange openings.

The door is free of a reduced thickness tear seam and has a size and shape to match the open end of the module housing. The door includes a circumference portion and has an inner surface and an outer surface. The door, in a static state, is disposed over the module housing to enclose the module housing open end with at least the circumference portion of the door disposed between the retainer ring and the module housing. The circumference portion of the door includes at least one release portion and at least one hinge section.

The attachment legs each include a foot portion disposed at an end thereof opposite the base portion, whereby the attachment leg foot portion is effective to prevent withdrawal of the attachment leg through the flange opening upon inflation of the inflatable restraint airbag cushion against the inner surface of the door.

Upon inflation of the inflatable restraint airbag cushion, the inflatable restraint airbag cushion expands against the inner surface of the door whereby at least the release portion is disposed from between the door retaining ring and the module housing with the door rotatably hinging about the at least one hinge section.

The invention still further comprehends a combination of an airbag module assembly having an airbag for restraining and protecting a driver and a steering wheel assembly in which said airbag module assembly is installed. More specifically, the combination includes a steering wheel having a hollow hub and opposed first and second ends. The combination also includes a module housing fitted within the hollow hub. The module housing forms a compartment. The module housing has at least one open end and includes at least one side wall, at least one face wall generally perpendicularly disposed relative to the at least one side wall about the at least one open end and a base wall also generally perpendicularly disposed relative to the at least one side wall, opposite the at least one open end. The base wall includes an opening passing therethrough.

The combination also includes a door retainer ring, a door, a collapsed inflatable restraint airbag cushion, and an inflator device. The door retainer ring is joined to the module housing about the module housing open end. The door includes a circumference portion and has an inner surface and an outer surface. The door, in a static state, is disposed over the module housing to enclose the module housing open end with at least the circumference portion of the door disposed between the door retainer ring and the module housing. The circumference portion of the door includes at least one release portion and at least one hinge section. The collapsed inflatable restraint airbag cushion is disposed within the module housing compartment. The inflatable restraint airbag cushion has an opening permitting passage of inflation gas into the inflatable restraint airbag cushion resulting in inflation and expansion of the inflatable restraint airbag cushion against the inner surface of the door whereby at least the release portion is disposed from between the door retaining ring and the module housing with the door rotatably hinging about the at least one hinge section. The inflator device is fitted within the module housing base wall opening. The inflator device, upon actuation, is in gas flow communication with the inflatable restraint airbag cushion.

Upon inflation of the inflatable restraint airbag cushion, the inflatable restraint airbag cushion expands against the inner surface of the door whereby at least the release portion is disposed from between the door retaining ring and the module housing with the door rotatably hinging about the at least one hinge section and the inflatable restraint airbag cushion deploys out of the compartment.

Other objects and advantages will be apparent to those skilled in the art from the following detailed description taken in conjunction with the appended claims and drawings.

DETAILED DESCRIPTION OF THE INVENTION

The present invention provides improved airbag module assemblies and combinations therewith. More particularly, the invention provides airbag module assemblies that include a door that opens upon the inflation without the use of reduced thickness tear seams.

Figure 1:
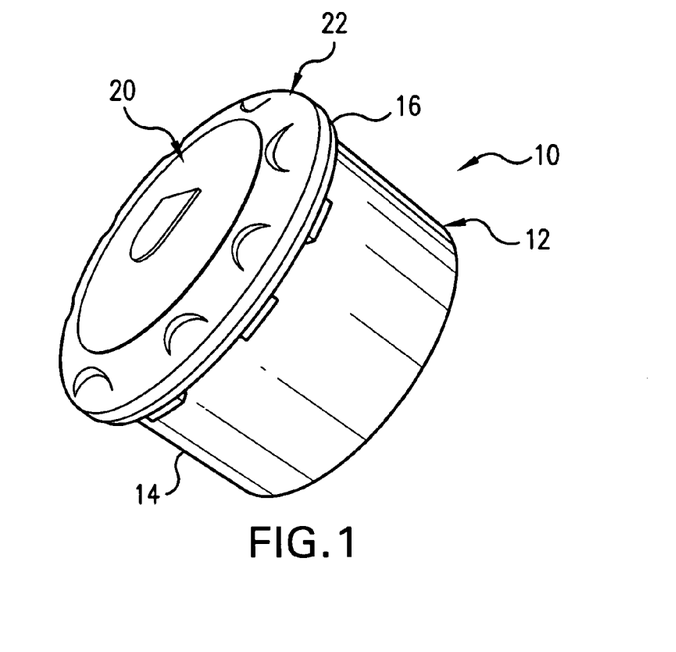
FIG. 1 is a simplified perspective view of an airbag module assembly, in accordance with one preferred embodiment of the invention.

FIG. 1 is an airbag module assembly 10 according to one embodiment of the invention. The airbag module assembly 10 includes a module housing 12 which forms a compartment adapted to contain an inflatable restraint airbag cushion when the inflatable restraint airbag cushion is in a stored state. The module housing 12 has a side wall 14 and a face wall, embodied in FIG. 1 as a one-piece, circular flange 16. The face wall is generally perpendicularly disposed relative to the side wall 14. As shown in the exploded view of the module housing 12 of FIG. 3, the module housing 12 has an open end 18. The flange 16 is disposed about the open end 18.

Referring again to FIG. 1, the airbag module assembly 10 is generally cylindrically shaped and includes a generally circular door 20. The door 20, when in a static state as shown in FIG. 1, is disposed over the module housing 12 to enclose the generally circular module housing open end 18. A door retainer ring 22, embodied in FIG. 1 as a circular bezel, is adapted to be joined to the module housing 12 about the module housing open end 18. A portion of the door 20 is disposed between the door retainer ring 22 and the module housing 12. In one embodiment or the invention, the door 20 is fabricated of one or more of various available polymer materials, such as, for example, thermoplastic elastomers (TPE) and/or thermoplastic olefins (TPO). As will be appreciated by one skilled in the art following the teachings herein provided, in one embodiment of the invention, choosing an appropriate polymer material for forming the door includes consideration, at least in part, of cosmetic requirements for the door. As will also be appreciated, the material(s) used in forming the door of the invention is/are not limited to typical materials presently used in forming cover member applications having tear seams.

As will be appreciated by one skilled in the art following the teachings herein provided, various sizes, shapes and configurations are available for the individual components of the airbag module assembly of this invention, including the module housing, side wall, face wall, door and door retainer ring. For example, the module housing can include more than one side wall and be formed, for example, in a four sided rectangular boxlike configuration. In such an embodiment, the open end of the module housing, as well as the door and door retainer ring can be formed in a square shape. Other examples of general shapes available for the open end of the module housing, the door and the door retainer ring include, for example, oval and trapezoidal. Also, in one embodiment of the invention, the module housing can include more than one face wall, such as, for example, two or more face walls equidistantly spaced apart about, and each extending only partially around, the open end of the module housing.

Figure 2:
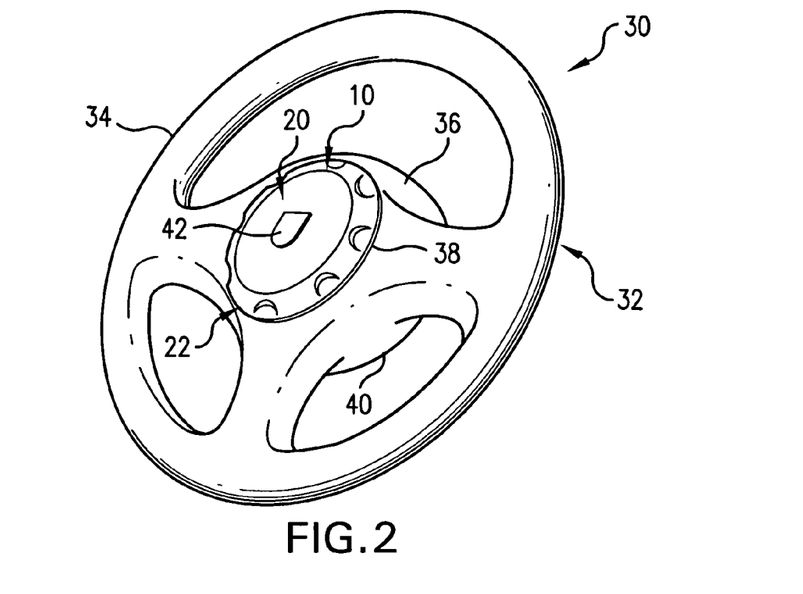
FIG. 2 is a simplified perspective view of a combination, including the airbag module assembly of FIG. 1 and a steering wheel assembly in which the airbag module assembly is installed, in accordance with one preferred embodiment of the invention.

FIG. 2 is a combination 30 of the airbag module assembly 10 and an automotive vehicle steering wheel assembly 32 in which the airbag module assembly 10 is installed. The combination includes a steering wheel 34 having a hollow hub 36. The hollow hub 36 forms the center portion of the steering wheel 34 and has a first end 38 and a second end 40 opposite the first end 38. The module housing 12 fits within the hollow hub 36, such that the door 20 is disposed at the hub first end 38 and toward, or facing, a vehicle operator. The door retainer ring 22 desirably provides, at the hollow hub first end 38, a decorative covering over the area between the hollow hub 36 and the door 20 and/or module housing 12. A portion of the door 20 and the door retainer ring 22 are visible to the vehicle operator, and, as will be appreciated by one skilled in the art following the teachings herein provided, can be designed to include additional desired design features such as to enhance vehicle appearance. For example, the door 20 includes an emblem badge 42, which can be, for example, a manufacturer's brand emblem. Also, the door retainer ring 22 can be desirably fabricated of various selected materials such as to match the interior trim of the vehicle. For example, the door retainer ring can be desirably fabricated of a material such as stainless steel or chrome or include wood grain trim.

Figure 3:
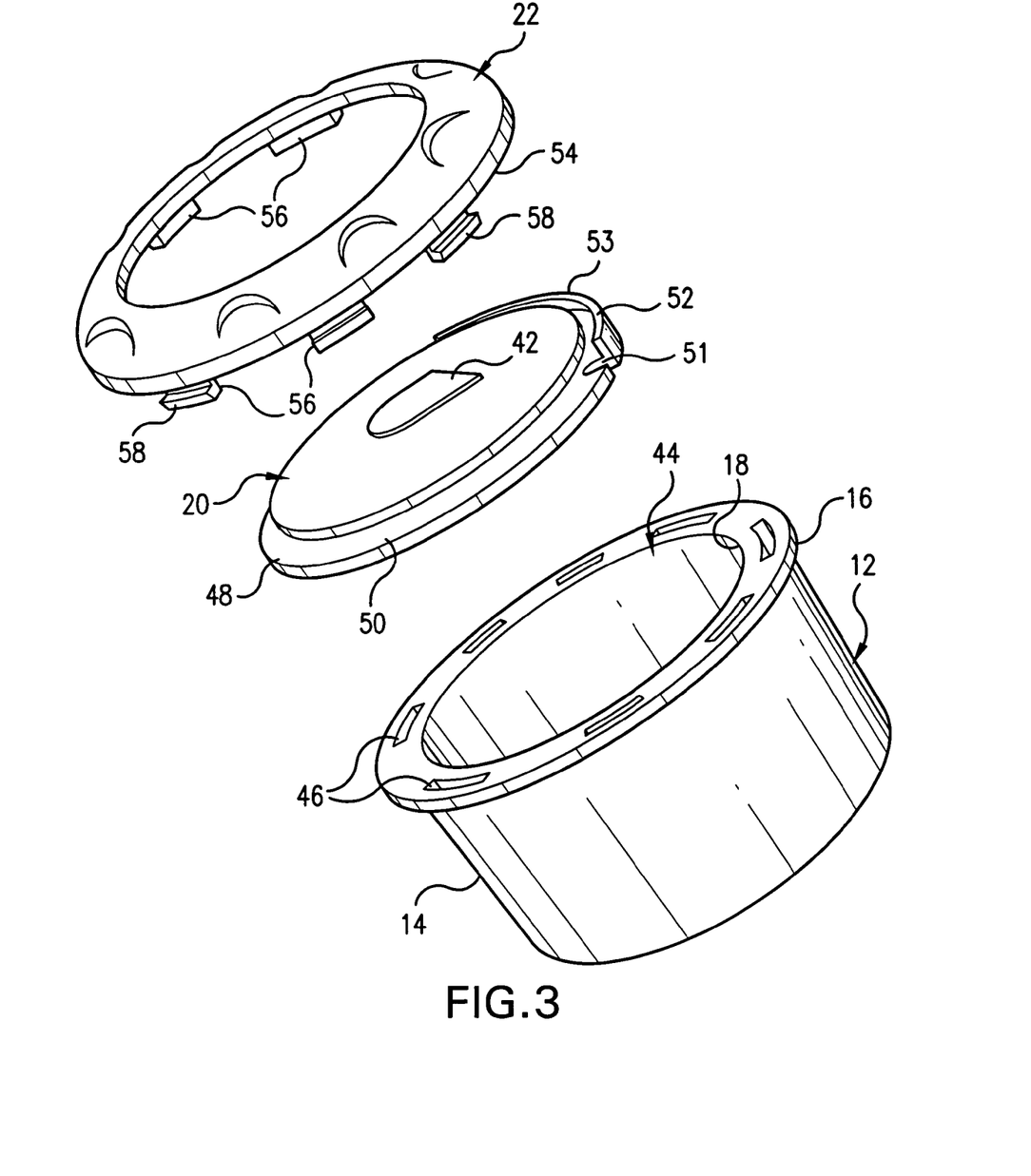
FIG. 3 is a simplified exploded perspective view of the airbag module assembly shown in FIG. 1.

FIG. 3 is an exploded view of the airbag module assembly 10. The module housing 12 forms a compartment 44 adapted to contain an inflatable restraint airbag cushion (not shown) in a stored state. The module housing 12 has an open end 18 and includes a side wall 14 and a face wall, embodied as a circular flange 16. The flange 16 is generally perpendicularly disposed relative to the side wall 14 about the open end 18. The flange 16 includes a plurality of openings 46 passing therethrough. The door 20 has a size and shape to match the open end 18 of the module housing 12. The door includes a circumference portion 48. The circumference portion 48 extends around a circumference of the door 20 and includes a release portion 50 and a hinge section 52. The hinge section 52 includes a rim 53 extending generally perpendicular from the circumference portion 48 and toward the door retainer ring 22. As is described below with reference to FIG. 5, the rim 53 desirably fits into a corresponding groove in a base portion 54 of the door retainer ring 22. In the embodiment of the invention shown in FIG. 3, the circumference portion 48 includes a recess 51 on either side of the hinge section 52 and between the hinge section 52 and the release portion 50. The recesses 51 promote bending, and thus opening, of the door 20 about the hinge section 52 upon inflation of the inflatable restraint airbag cushion.

When the airbag module assembly 10 is in an assembled state, the circumference portion 48 is disposed between the flange 16 and the door retainer ring 22. The door retainer ring 22 includes the base portion 54 with a plurality of attachment legs 56 generally perpendicularly extending from the base portion 54. Each of the attachment legs 56 is in register with a corresponding one of the flange openings 46. The attachment legs 56 each include a foot portion 58 disposed at an end of the attachment leg 56 opposite the base portion 54. Upon latching to the flange 16, the attachment leg foot portions 58 prevent withdrawal of the attachment legs 56 through the flange opening 46 upon inflation of the inflatable restraint airbag cushion against the door 20.

Figure 4:
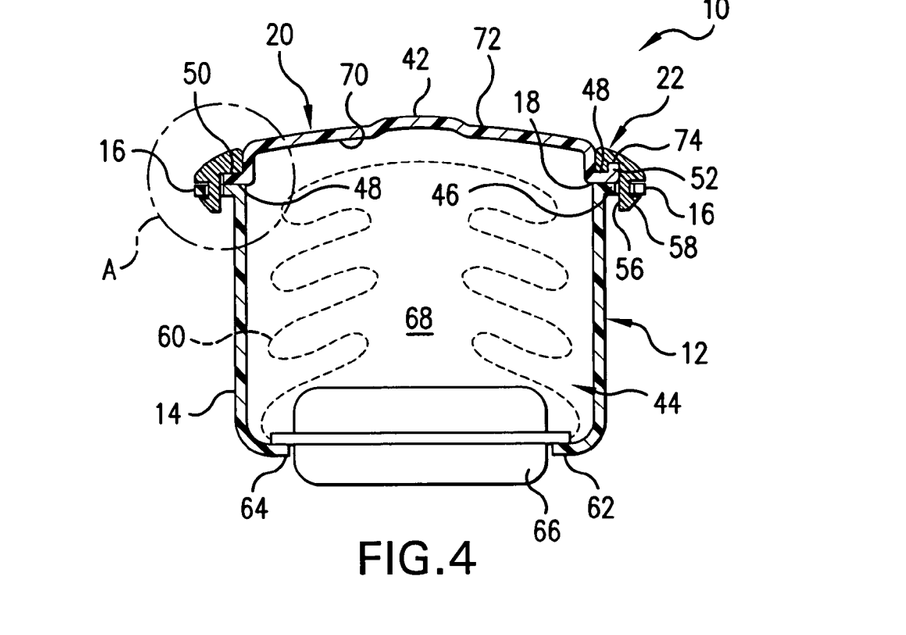
FIG. 4 is a simplified cross sectional view of the airbag module assembly shown in FIG. 1.

FIG. 4 is a simplified cross sectional view of the airbag module assembly 10 shown in FIG. 1. The module housing 12 forms the compartment 44 adapted to contain an inflatable restraint airbag cushion in a stored state, represented in phantom by folded inflatable airbag cushion 60. The module housing 12 includes a base wall 62 generally perpendicularly disposed relative to the side wall 14 and opposite the open end 18. The base wall 62 includes an opening 64 adapted to permit fitting therethrough of a portion of an inflator device, illustrated for simplicity as inflator device 66. As will be appreciated by one skilled in the art following the teachings herein provided, the airbag module assembly of the invention is not limited to any particular inflator device type and/or configuration. The inflatable airbag cushion 60 is attached in inflation communication to the inflator device 66. Upon activation of the inflator device 66, inflation gas is produced and introduced into an inflation chamber 68 of the inflatable airbag cushion 60, thereby inflating the inflatable airbag cushion 60.

As shown in FIG. 4, the door 20 has a size and shape to match the open end 18 of the module housing 12. The door 20 has an inner surface 70 and an outer surface 72. The door 20, in the static state shown in FIG. 4, is disposed over the module housing 12 to enclose the module housing open end 18. The circumference portion 48 of the door 20 disposed between the door retainer ring 22 and the module housing flange 16. Each of the door retainer ring attachment legs 56 is in register with a corresponding one of the flange openings 46. The attachment legs 56 each extend through the corresponding flange opening 46. The attachment leg foot portions 58 each snap-lock over a side of the flange 16 opposite the door retainer ring 22, thereby preventing withdrawal of the attachment legs 56 through the flange openings 46, particularly upon inflation of the inflatable restraint airbag cushion 60 against the inner surface 70 of the door 20. The door retainer ring 22 secures the door 20 to the module housing 12 by holding or pressing the circumference portion 48 against the flange 16. The door retainer ring 22 includes a groove 74 into which the hinge section rim 53 of the circumference portion 48 fits.

Figure 5:
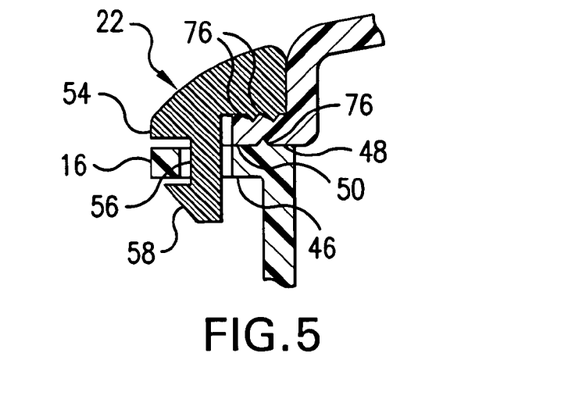
FIG. 5 is an enlargement of the portion of the cross sectional view of the airbag module assembly shown in FIG. 4 within the circle A.

FIG. 5 shows an enlargement of the portion of the cross sectional view the airbag module assembly 10 shown in FIG. 4 within circle A. As shown in FIG. 5, the release portion 50 of the circumference portion 48 is secured between the door retainer ring 22 and the flange 16. In one embodiment of the invention, one or more of the door retainer ring, the door circumference portion and the face wall include at least one ridge effective to further secure the selected member to another member of the assembly in direct contact therewith. As shown in FIG. 5 the door retainer ring 22 includes two ridges 76 and the flange 16 includes one ridge 76 that extend or bite into the release portion 50, which is desirably formed of a pliable or flexible material, such as a thermoplastic elastomer, thermoplastic olefin or rubber. Upon inflation of the inflatable restraint airbag cushion 60, the inflatable restraint airbag cushion 60 expands against the inner surface 70 of the door 20. The pressure form the inflating restraint airbag cushion 60 causes the release portion 50 to be disposed from, i.e., pulled out from, between the door retaining ring 22 and the module housing 12. The door 20 rotatably hinges about the hinge section 52 during opening. The open door 20 desirably remains connected to the module housing at the hinge section 52.

By securing the door 20 to the module housing 12 by the retainer collar 22 in the above described manner, the invention provides a door free of a reduced thickness tear seam such as often currently used to allow the inflating restraint airbag cushion to inflate out of current module housings. Advantages of not including a reduced thickness tear seam include alternative and/or less complex manufacturing processes, as well as cosmetic benefits. For example, by not including a reduced thickness tear seam, the additional and time consuming manufacturing processes needed to form the reduced thickness tear seam are avoided. In other words, the manufacturing process is not tuned to, or centered around, the reduced thickness tear seam. Also, by not including a reduced thickness tear seam, the door can more easily include or incorporate an injection molded emblem, more easily include or incorporate mold-in color, be more easily painted, and/or include a wider range of finishes, such as for example, applique and/or fine grain or large grain finishes.

In addition, the invention provides a door hinge mechanism that is generally less complex than currently used hinge mechanisms. Further the nature of the door opening mechanism of the invention can provide improved out-of-position occupant performance as the initiation of the opening can occur in more than one place allowing for sideways deployment when obstructed. In this manner, if the occupant is obstructing the door, it is possible for the restraint airbag cushion to follow a path of least resistance, thereby reducing or eliminating any force on the out-of-position occupant. The invention also facilitates implementation of design changes in an automobile model, in that the door and/or door retainer rim can be exchanged with a door and/or door retainer rim having different emblems, colors and/or trim elements.

Figure 6:
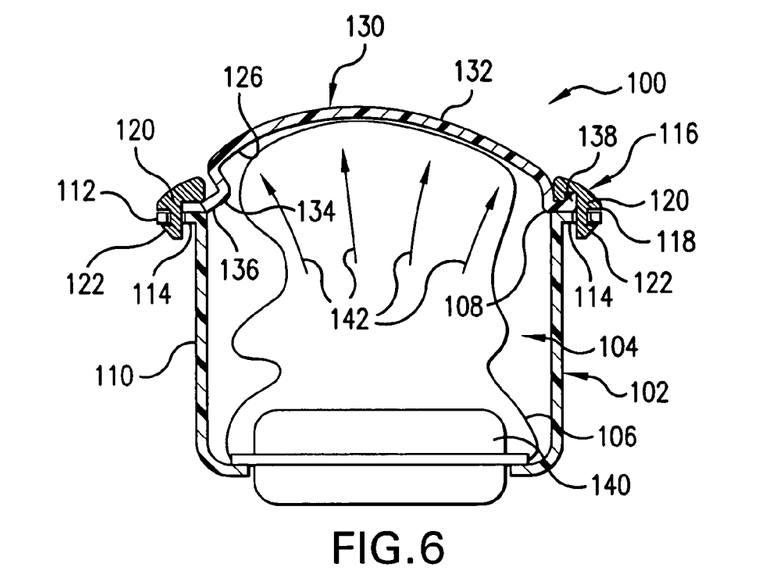
FIG. 6 is a simplified cross sectional view of an airbag module assembly in accordance with one embodiment of the invention illustrating the force exerted on the door as the inflatable restraint airbag cushion expands thereagainst.
Figure 7:
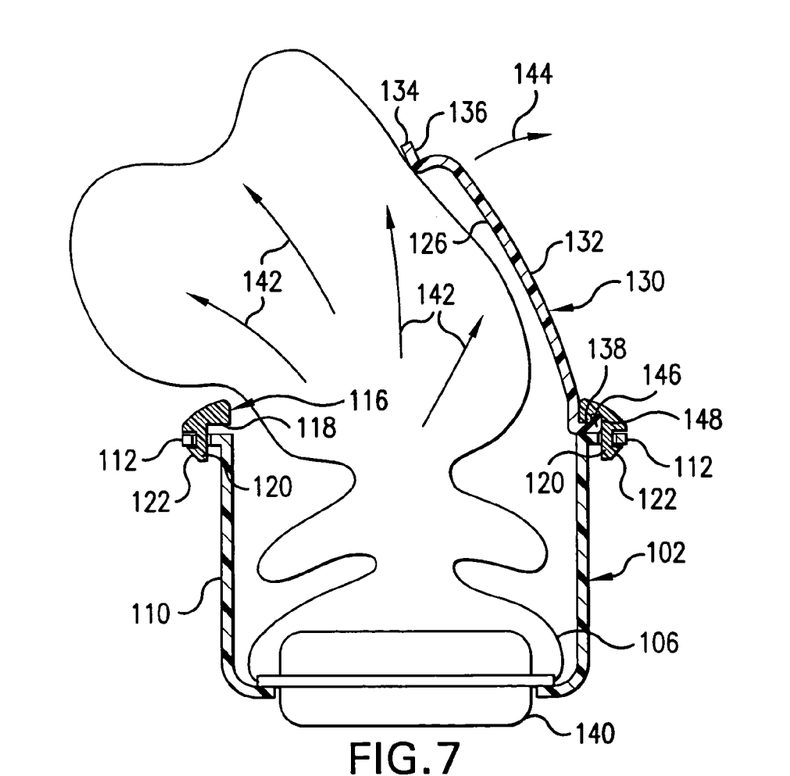
FIG. 7 is a simplified cross sectional view of the airbag module assembly shown in FIG. 6 as the inflatable restraint airbag cushion further expands against the door resulting in the door rotatably hinging open.

FIGS. 6 and 7 illustrate the inflation of an inflatable restraint airbag cushion from an airbag module assembly 100 in accordance with one embodiment of the invention. The airbag module assembly 100 includes a module housing 102 sized and shaped to fit within an automotive vehicle steering wheel hub. The module housing 102 forms a compartment 104 adapted to contain an inflatable restraint airbag cushion 106. The module housing 102 has an open end 108 and includes a side wall 110 and a face wall 112. The face wall 112 is generally perpendicularly disposed relative to the side wall 110 about the open end 108. The face wall 112 includes a plurality of openings 114 passing therethrough, and can be formed, for example, as a circular flange as described above in FIG. 3.

The airbag module assembly 100 includes a door retainer ring 116 joined to the module housing 102 about the module housing open end 108. The door retainer ring 116 includes a base portion 118 and a plurality of attachment legs 120 generally perpendicularly extending from the base portion 118. Each of the attachment legs 120 is in register with a corresponding one of the openings 114. The attachment legs 120 each include a foot portion 122 disposed at an end of the attachment leg 120 opposite the base portion 118. The attachment leg foot portion 122 is effective to prevent withdrawal of the attachment leg through the opening 114 upon inflation of the inflatable restraint airbag cushion 106 against an inner surface 126 of a door 130.

The door 130 has a size and shape to match and cover the open end 108 of the module housing 102. The door 130 has an inner surface 126 and an outer surface 132. The door 130, when in a static state, is disposed over the module housing 102 to enclose the module housing open end 108, and a circumference portion 134 of the door 130 is disposed between the door retainer ring 116 and the module housing 102. The circumference portion 134 includes a release portion 136 and a hinge section 138.

FIG. 6 illustrates the inflatable restraint airbag cushion 106 during an initial stage of deployment. Upon activation of an inflator device 140, inflation gas inflates the inflatable restraint airbag cushion 106 in a direction toward the door inner surface 126, as indicated by arrows 142. The inflatable restraint airbag cushion 106 expands against the door inner surface 126. The door 130 bends under the pressure exerted by the inflating airbag cushion 106, thereby causing the release portion 136 to pull out from between the door retaining ring 116 and the module housing 102.

FIG. 7 illustrates the inflatable restraint airbag cushion 106 during another, later stage of deployment. The release portion 136, by the pressure of the inflating inflatable restraint airbag cushion 106, has been removed from between the door retaining ring 116 and the module housing 102. The door 130 rotates about the hinge section 138 in a direction of arrow 144. The hinge section 138 includes a rim 146 fitting into a corresponding groove 148 in the door retainer ring 108, which secures the hinge section 138 between the door retaining ring 116 and the module housing 102 during opening of the door 130.

Thus, the invention provides an improved airbag module assembly that avoids the use of tear seams or lines of reduced thickness in a cover member, i.e., door. The invention thus can minimize or avoid cosmetic or appearance problems commonly associated with such tear seams or lines of reduced thickness. Further, the invention provides an improved airbag module assembly having a cover member that opens upon inflation of an inflatable restraint airbag cushion in a relatively simple, effective and efficient manner without additional features such as, for example, secondary components, such as rivets or other fasteners or the like, secondary operations, such as crimping or the like, and/or relatively intricate or complicated shapes or forms.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. An airbag module assembly comprising:
    a module housing forming a compartment adapted to contain an inflatable restraint airbag cushion in a stored state, said module housing having at least one open end and including at least one side wall and at least one face wall generally perpendicularly disposed relative to the at least one side wall about the at least one open end;
    a door retainer ring adapted to be joined to said module housing about the module housing open end; and
    a door including a circumference portion, said door having an inner surface and an outer surface, said door, in a static state, disposed over said module housing to enclose the module housing open end with at least the circumference portion of said door disposed between said door retainer ring and said module housing, the circumference portion of said door including at least one release portion and at least one hinge section;
    wherein upon inflation of the inflatable restraint airbag cushion, the inflatable restraint airbag cushion expands against the inner surface of said door whereby at least the release portion is disposed from between said door retaining ring and said module housing with said door rotatably hinging about the at least one hinge section.

2. The airbag module assembly of claim 1 wherein the module housing face wall comprises a flange disposed at an end of the side wall.

3. The airbag module assembly of claim 2 wherein the flange comprises a plurality of openings passing therethrough.

4. The airbag module assembly of claim 3 wherein said door retainer ring comprises a base portion and a plurality of attachment legs generally perpendicularly extending from the base portion.

5. The airbag module assembly of claim 4 wherein each of the attachment legs is in register with a corresponding one of the flange openings and wherein the attachment legs each include a foot portion disposed at an end thereof opposite the base portion, whereby the attachment leg foot portion is effective to prevent withdrawal of the attachment leg through the flange opening upon inflation of the inflatable restraint airbag cushion against the inner surface of said door.

6. The airbag module assembly of claim 1 wherein said module housing additionally comprises a base wall generally perpendicularly disposed relative to the at least one side wall, opposite the at least one open end.

7. The airbag module assembly of claim 6 wherein the base wall includes an opening adapted to permit fitting of a portion of an inflator device therethrough.

8. The airbag module assembly of claim 1 wherein one or more members of the assembly selected from the group consisting of said door retainer ring, the door circumference portion and the face wall includes at least one ridge effective to further secure the selected member to another member of the assembly in direct contact therewith.

9. The airbag module assembly of claim 1 wherein the at least one open end of said module housing is generally circular in cross section.

10. The airbag module assembly of claim 9 wherein said door is generally circular in cross section and sized to cover the open end of said module housing and wherein said door retainer ring is a circular bezel.

11. The airbag module assembly of claim 1 wherein said door is free of a reduced thickness tear seam.

12. The airbag module assembly of claim 1 wherein said door is fabricated of thermoplastic elastomers, thermoplastic olefins and combinations thereof.

13. A cylindrical airbag module assembly comprising:
    a module housing generally circular in cross section and sized and shaped to fit within an automotive vehicle steering wheel hub, said module housing forming a compartment adapted to contain an inflatable restraint airbag cushion in a stored state, said module housing having at least one open end and including at least one side wall and at least one face wall generally perpendicularly disposed relative to the at least one side wall about the at least one open end, the face wall forming a flange comprising a plurality of openings passing therethrough;

a door retainer ring comprising a circular bezel and adapted to be joined to said module housing about the module housing open end, said door retainer ring comprising a base portion and a plurality of attachment legs generally perpendicularly extending from the base portion, wherein each of the attachment legs is in register with a corresponding one of the flange openings and wherein the attachment legs each include a foot portion disposed at an end thereof opposite the base portion, whereby the attachment leg foot portion is effective to prevent withdrawal of the attachment leg through the flange opening upon inflation of the inflatable restraint airbag cushion against the inner surface of said door; and a door having a size and shape to match the open end of said module housing, said door including a circumference portion, said door having an inner surface and an outer surface, said door, in a static state, disposed over said module housing to enclose the module housing open end with at least the circumference portion of said door disposed between said door retainer ring and said module housing, the circumference portion of said door including at least one release portion and at least one hinge section;

wherein upon inflation of the inflatable restraint airbag cushion, said inflatable restraint airbag cushion expands against the inner surface of said door whereby at least the release portion is disposed from between said door retaining ring and said module housing with said door rotatably hinging about the at least one hinge section; and wherein said door is free of a reduced thickness tear seam.

14. The airbag module assembly of claim 13 wherein said module housing additionally comprises a base wall generally perpendicularly disposed relative to the at least one side wall, opposite the at least one open end.

15. The airbag module assembly of claim 14 wherein the base wall includes an opening adapted to permit fitting of a portion of an inflator device therethrough.

16. The airbag module assembly of claim 13 wherein one or more members of the assembly selected from the group consisting of said door retainer ring, the door circumference portion and the face wall includes at least one ridge effective to further secure the selected member to another member of the assembly in direct contact therewith.

17. The airbag module assembly of claim 13 wherein said door is fabricated of thermoplastic elastomers, thermoplastic olefins and combinatons thereof.

18. In combination, an airbag module assembly having an airbag for restraining and protecting a driver and a steering wheel assembly in which said airbag module assembly is installed, the combination comprising:

a steering wheel having a hollow hub and opposed first and second ends, a module housing fitted within the hollow hub, said module housing forming a compartment, said module housing having at least one open end and including at least one side wall, at least one face wall generally perpendicularly disposed relative to the at least one side wall about the at least one open end and a base wall also generally perpendicularly disposed relative to the at least one side wall, opposite the at least one open end, the base wall including an opening passing therethrough;

a door retainer ring joined to said module housing about the module housing open end;

a door including a circumference portion, said door having an inner surface and an outer surface, said door, in a static state, disposed over said module housing to enclose the module housing open end with at least the circumference portion of said door disposed between said door retainer ring and said module housing, the circumference portion of said door including at least one release portion and at least one hinge section;

a collapsed inflatable restraint airbag cushion disposed within the module housing compartment, said inflatable restraint airbag cushion having an opening permitting passage of inflation gas into said inflatable restraint airbag cushion resulting in inflation and expansion of said inflatable restraint airbag cushion against the inner surface of said door whereby at least the release portion is disposed from between said door retaining ring and said module housing with said door rotatably hinging about the at least one hinge section; and an inflator device fitted within the module housing base wall opening, said inflator device, upon actuation, in gas flow communication with said inflatable restraint airbag cushion;

wherein upon inflation of said inflatable restraint airbag cushion, said inflatable restraint airbag cushion expands against the inner surface of said door whereby at least the release portion is disposed from between said door retaining ring and said module housing with said door rotatably hinging about the at least one hinge section and said inflatable restraint airbag cushion deploys out of the compartment.

19. The combination of claim 18 wherein the module housing face wall comprises a flange disposed at an end of the side wall.

20. The combination of claim 19 wherein the flange comprises a plurality of openings passing therethrough.

21. The combination of claim 20 wherein said door retainer ring comprises a base portion and a plurality of attachment legs generally perpendicularly extending from the base portion.

22. The combination of claim 21 wherein each of the attachment legs is in register with a corresponding one of the flange openings and wherein the attachment legs each include a foot portion disposed at an end thereof opposite the base portion, whereby the attachment leg foot portion is effective to prevent withdrawal of the attachment leg through the flange opening upon inflation of the inflatable restraint airbag cushion against the inner surface of said door.

23. The combination of claim 18 wherein one or more members of the assembly selected from the group consisting of said door retainer ring, the door circumference portion and the face wall includes at least one ridge effective to further secure the selected member to another member of the assembly in direct contact therewith.

24. The combination of claim 18 wherein the at least one open end of said module housing is generally circular in cross section.

25. The combination of claim 24 wherein said door is generally circular in cross section and sized to cover the open end of said module housing and wherein said door retainer ring is a circular bezel.

26. The combination of claim 18 wherein said door is free of a reduced thickness tear seam.

27. The combination of claim 18 wherein said door is fabricated of thermoplastic elastomers, thermoplastic olefins and combinatons thereof.

* * * * *